Dec. 13, 1949     E. C. LANGHAM     2,491,117
AUTOMOBILE WHEEL TRUING APPARATUS
Filed July 2, 1948     3 Sheets-Sheet 1

INVENTOR.
Edward C. Langham
BY
McMorrow, Berman + Davidson
ATTORNEYS

Dec. 13, 1949     E. C. LANGHAM     2,491,117
AUTOMOBILE WHEEL TRUING APPARATUS
Filed July 2, 1948     3 Sheets-Sheet 2

INVENTOR.
Edward C. Langham
BY
McMorrow, Berman + Davidson
ATTORNEYS

Dec. 13, 1949 E. C. LANGHAM 2,491,117
AUTOMOBILE WHEEL TRUING APPARATUS
Filed July 2, 1948 3 Sheets-Sheet 3

Fig. 6.A

INVENTOR.
Edward C. Langham
BY
McMorrow, Berman + Davidson
ATTORNEYS

Patented Dec. 13, 1949

2,491,117

UNITED STATES PATENT OFFICE 2,491,117

AUTOMOBILE WHEEL TRUING APPARATUS

Edward C. Langham, Montgomery, Ala.

Application July 2, 1948, Serial No. 36,643

1 Claim. (Cl. 153—32)

This invention relates to improvements in wheel truing apparatus and more particularly to improved apparatus for adjusting the front wheels of automotive vehicles such as automobiles and trucks.

It is among the objects of the invention to provide improved wheel adjusting apparatus which is operative to check the camber, caster and toe-in of the front wheels of automotive vehicles and to apply pressure to the front wheel mounting structure, such as the front wheel axle or independent wheel suspension mechanism, to increase or decrease the front wheel camber as may be necessary, which apparatus is easy to use, accomplishes the desired results with a large saving in time and manual labor, is simple and durable in construction, easy and economical to install, extremely economical to manufacture, accurate and efficient in operation, and which will accommodate automobiles and trucks of various sizes and manufacture.

Other objects and advantages will become apparent from a consideration of the following description and the appended claims in conjunction with the accompanying drawings, wherein:

Figure 6a is a perspective view of a movable, jack-supporting beam of somewhat different construction than the beam illustrated in Figure 6;

Figure 1:
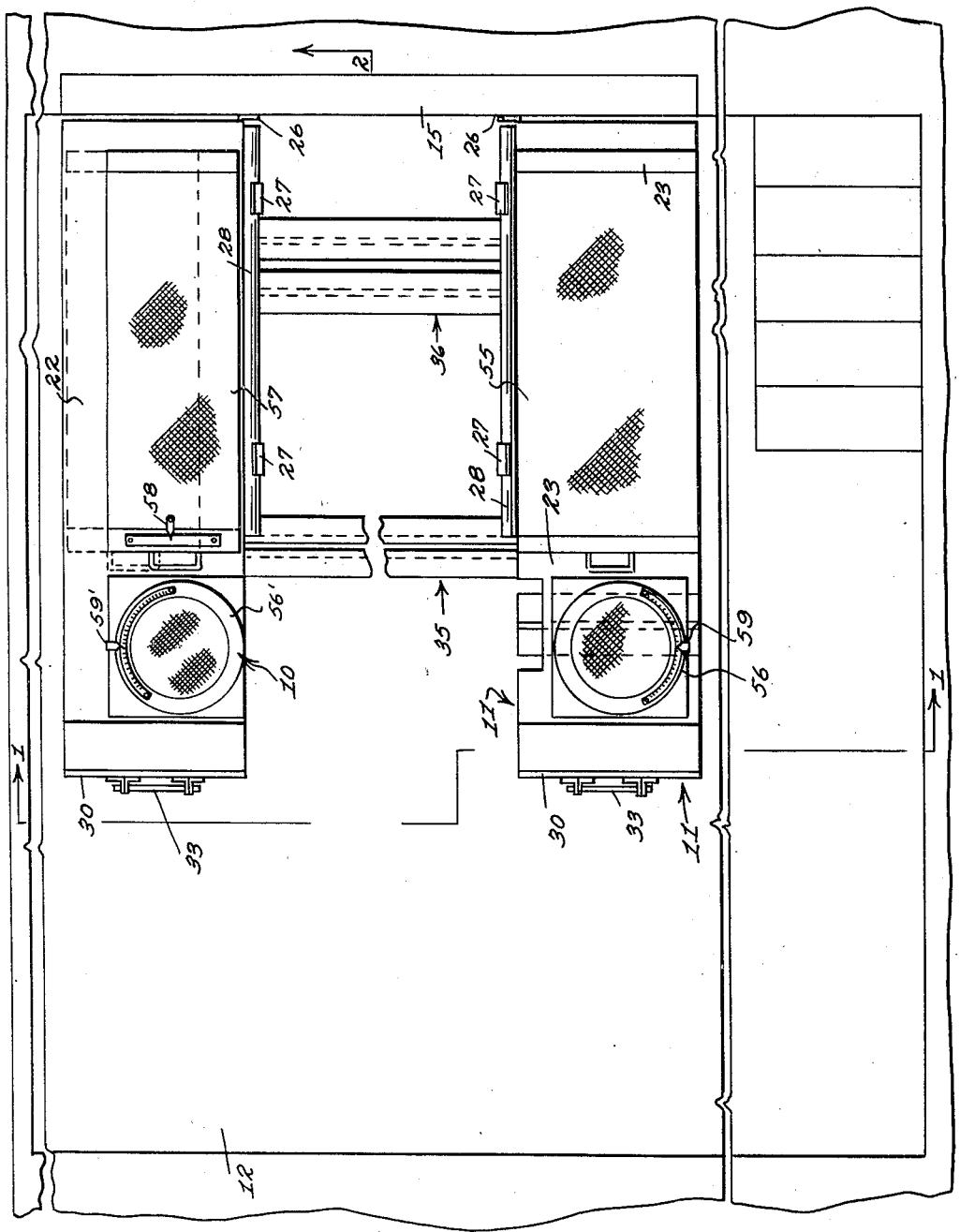
Figure 1 is a top plan view of the apparatus illustrative of the invention.

With continued reference to the drawings, the improved wheel checking and adjusting apparatus comprises two spaced-apart, substantially-parallel supports, generally indicated at 10 and 11, extending outwardly at floor level from one edge of an operating pit 12.

Each support comprises a pair of heavy channel irons 13 arranged face-to-face in spaced, substantially parallel relationship with corresponding ends bearing against the back vertical wall 14 of the pit, such wall being preferably formed of reinforced concrete to facilitate the proper attachment of the supports thereto. An angle iron supporting rail 15 is imbedded in the concrete along the upper edge of the vertical wall 14 of the pit in a manner such that its outer surfaces are flushed with the floor 16 adjacent the pit and the vertical wall 14 and this rail is firmly secured in position by anchor hooks 17 extending through suitable apertures provided in the rail and embedded in the concrete adjacent the edge of the pit.

Each of the supports 10 and 11 is carried on a pair of spaced apart pedestals 19 which may be conveniently provided as short sections of standard I beam as illustrated, or may be concrete pillars or other suitable structures as may be found convenient. In the illustrated arrangement, the two pedestals are anchored to the concrete floor 20 of the pit by suitable screwthreaded anchor hooks 21 imbedded in the concrete of the pit floor and bear at their lower surfaces on the floor of the pit and at their upper surfaces against the under sides of the channel irons 13 of the corresponding supports 10 and 11. A respective cover plate 22 covers the upper surfaces of the channel irons of the support 10 and extends laterally beyond both of the channel irons, and a similar cover plate 23 is secured to the upper surfaces of the channel irons 13 of the support 11 extending laterally beyond both of the channel irons. Respective angle irons 24 are secured along the upper edge of each inner channel iron 13 in the angle between the outer surface of such channel iron and the inwardly extending portion of the corresponding cover plate 22 or 23, and somewhat larger angle irons 25 secured to the under surface of the inwardly projecting portion of each cover plate abutting each corresponding channel iron 24 to provide a composite member of channel shape along the upper edge of each inner channel iron 13 underlying and secured to the inwardly projecting portion of the cover plate. Rail 15 has two angle brackets 26 secured thereto in alignment with the depending outer legs of the two channel irons 25 which brackets are firmly secured to the corresponding angle irons 25 to secure the supports to the pit wall at the upper edge thereof. Standards 27 extend upwardly from the outer depending legs of angle irons 25 above the corresponding cover plates 22 and 23 and support at their upper ends guard rails 28 positioned one at the inner side which support above the upper surface of the corresponding cover plate to guard the inner sides of the support against the possibility of automobile wheels running off of the supports. A pair of vertically disposed, spaced apart angle irons 27 are secured to the end of each support opposite the end attached to the pit wall 14 and a wheel stop 30 is secured to the outer end of each support by means of the corresponding angle irons 29. Each wheel stop 30 comprises a rectangular plate 31 from which depend a pair of spaced apart angle iron legs 32 which fit within the outwardly extending legs of the corresponding angle irons 29, the outwardly extending legs of angle irons 29 and 32 being suitably apertured to receive pins 33 which respectively secure the stop plates to the outer ends of the supports.

Respective angle irons 34 extend along the bottom edges of the inner channel irons 13 and rest upon the top of the supports 19. These angle irons 34 are so disposed that one leg at each angle iron is substantially vertical and in contact with the vertical inner surface of the corresponding channel iron 13 and the other leg is substantially horizontal and directed inwardly of the support to which the angle iron is attached toward the opposite support. The horizontally disposed legs of the angle iron 34 provides a continuous track for the ends of the jack supporting beams generally indicated at 35 and 36.

The jack supporting beam 35 is of lighter construction than the corresponding beam 36 and is provided particularly for use in correcting the front wheel camber of relatively light automotive vehicle such as passenger automobiles. This beam comprises a pair of channel irons 37 secured together in back-to-back relationship with their webs spaced apart by spacing blocks 38 extending between the webs one at each end of the beam. This construction provides a longitudinally extending medial slot in the beam between the spacing blocks 38 for a purpose which will presently appear.

The beam 36 is for heavy duty work as correcting the front wheel camber of heavier automotive vehicles such as trucks and busses and comprises a pair of heavy duty I-beams 39 secured in spaced apart, side-by-side relationship by spacing blocks 40 disposed between the web of the I-beam one at each end of the composite beam. This construction also provides a jack supporting beam having a longitudinally extending medial slot 41 between the two I-beam members.

When in operative position the beams 35 and 36 are substantially in vertical alignment with the front supports 19. Both beams are shiftable back and forth along the track provided by the angle irons 34 and either or both of the beams may be removed from the apparatus if it is desired to completely clear the apparatus for work which does not involve the use of either beam. Even when the beams are being used to adjust the front wheel camber of a vehicle the beam being used may be moved to operative position for bending the front axle or wheel suspension mechanism or may be quickly pushed backwardly out of the way for other work incident to properly checking and adjusting the front wheels.

Figures 2, 3:
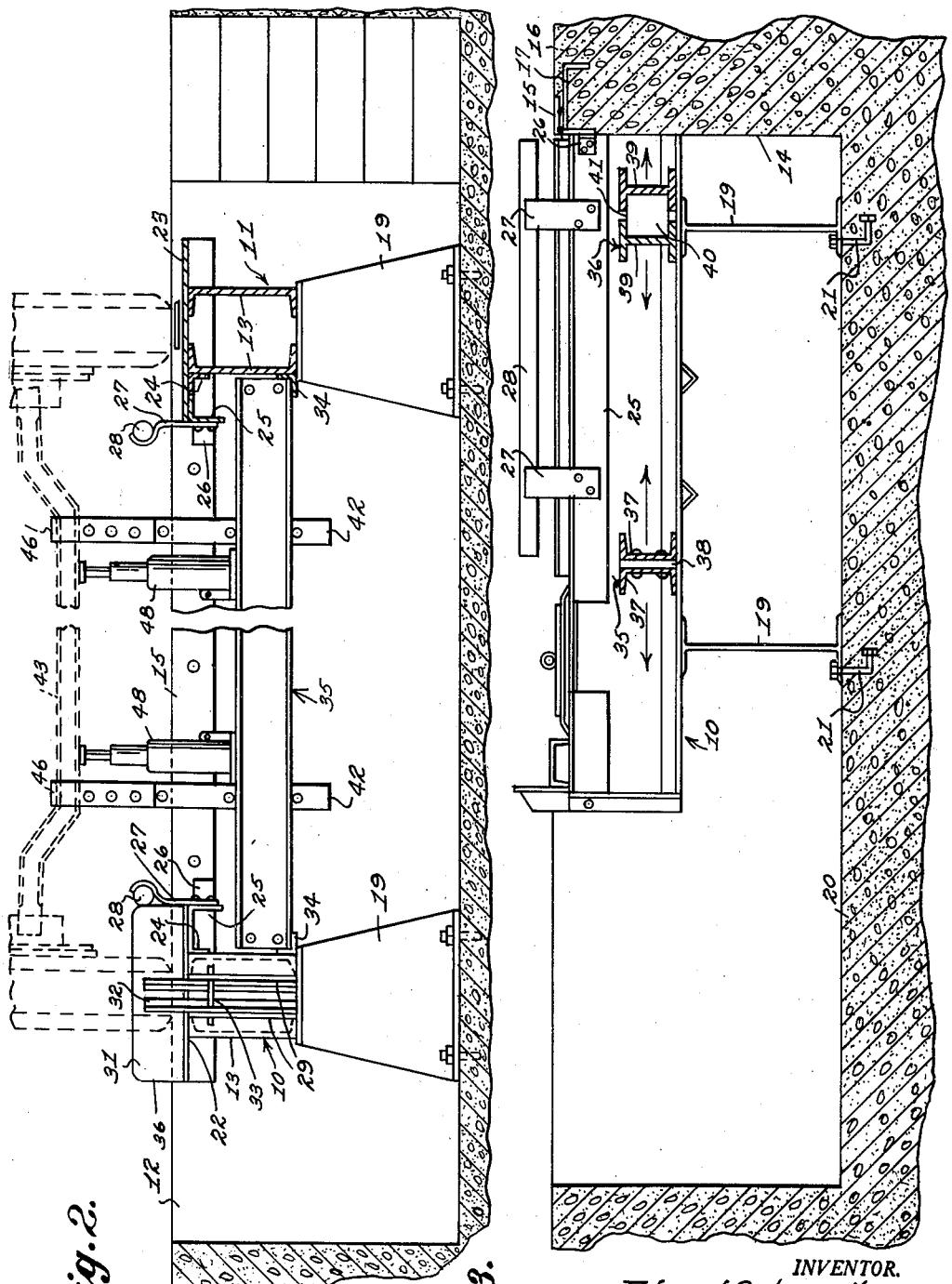
Figure 2 is an end elevation of the apparatus illustrated in Figure 1 showing in broken lines an automobile axle operatively engaged by the apparatus.
Figure 3 is a longitudinal cross section of its apparatus illustrated in Figure 2.
Figure 4:
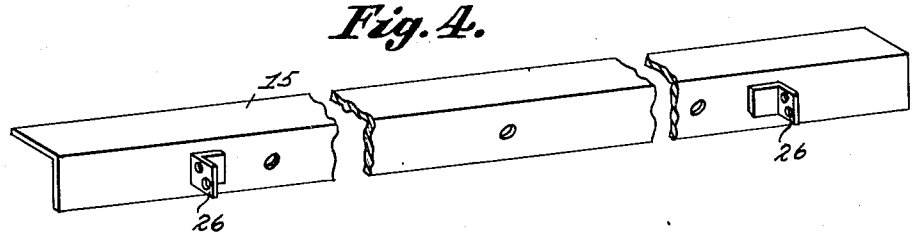
Figure 4 is a perspective view of a supporting rail constituting an operative component of the apparatus.
Figure 7:
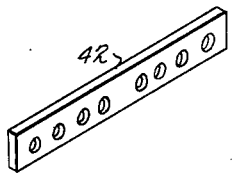
Figure 7 is a perspective view of a hold-down bar for the apparatus.

Figure 2 illustrates the manner in which the beams are used for increasing the front wheel camber of a vehicle. In this arrangement two apertured, hold-down bars 42 are extended downwardly through the medial slot in the appropriate beam 35 or 36 at predetermined positions longitudinally of the vehicle axle 43.

Figure 8:
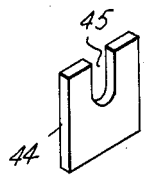
Figure 8 is a perspective view of a lock plate for the hold-down mechanism.
Figure 11:
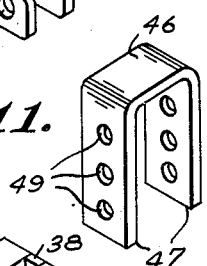
Figure 11 is a still further modified form of hold-down clevis for use with the wheel adjusting apparatus.
Figure 6:
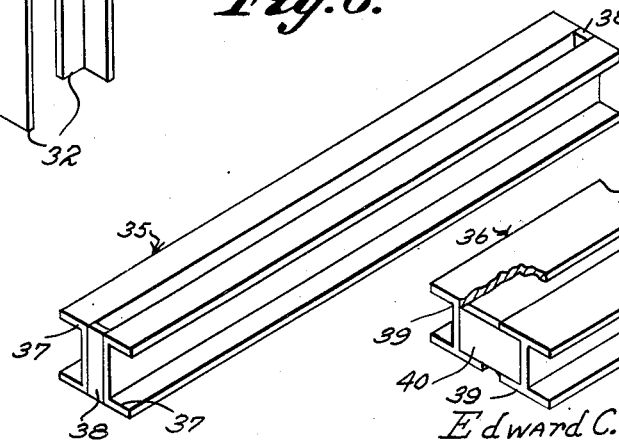
Figure 6 is a perspective view of a fragmentary portion of a movable, jack-supporting beam constituting an operative component of the apparatus.
Figure 6:
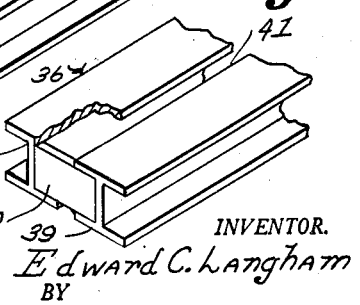

These bars are secured against upper movement relative to the supporting beam 35 or 36 by respective anchoring blocks 44 particularly illustrated in Figure 8. Each anchoring block has a slot therein for receiving major portions of the corresponding hold-down bar and the block is placed so as to receive the bar in the slot or notch 45 of the block with the block bearing against the bottom surface of the block supporting beam. A pin is then inserted through an aperture in the bar immediately below the block so that the bar cannot be pulled upwardly relatively to the beam. A suitable hold-down clevis, such as the clevis 46, particularly illustrated in Figure 11, is then placed over the axle with its apertured legs 47 disposed one at each side of the apertured bar 42 and a pin is inserted through registering apertures in the clevis and the bar to firmly secure the clevis to the bar. After the two hold-down bars and hold-down clevises are secured in operative position, two suitable jacks, preferably hydraulic jacks, 48 are placed upon the jack supporting beam and forced upwardly against the under surface of the vehicles front axle. When it is desired to increase the front wheel camber, as illustrated in Figure 2, the jacks are disposed one at the inner side of each respective hold-down bar 42. When it is desired to decrease the camber the hold-down bars and clevises are positioned somewhat inwardly of the position illustrated in Figure 2 and the jacks are disposed one at the outer side of each respective hold-down bar to force the end portions of the axle upwardly.

Figure 9:
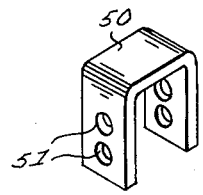
Figure 9 is a perspective view of one form of hold-down clevis.
Figure 5:
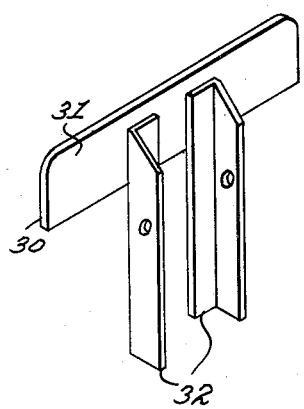
Figure 5 is a perspective view of a wheel stop, two of which are utilized to limit the movement of vehicle front wheels outwardly of the apparatus.
Figure 10:
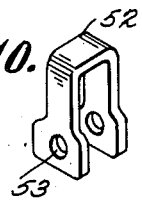
Figure 10 is a perspective view of a somewhat modified form of hold-down clevis particularly adapted for use with a particular make of automobile.

In addition to the hold-down clevises 46, each having elongated, substantially parallel legs provided with three longitudinally spaced apart apertures 49 therein other clevises are provided for types of vehicles to which the clevis 46 is not adaptable. For example, a smaller clevis 50 is illustrated in Figure 9 which smaller clevis is of the same shape as the clevis 46 and is preferably of somewhat lighter weight construction and has shorter, parallel legs provided with two spaced apart apertures 51 while the clevis 52, particularly illustrated in Figure 10, is especially designed for use with Ford built automobiles and is of still lighter weight construction than the clevis 50 and has its parallel legs provided with only a single aperture 53 in each leg.

Other clamps and bars may be provided for adjusting various types of independent wheel suspension mechanisms, all of such devices being usable with one or the other of the jack supporting beams 35 and 36.

The cover plate 23 on support 11 carries a fixed tread plate 55 thereon which tread plate has a width substantially equal to that of the cover plate and is provided with a roughened upper surface. The tread plate 55 is shorter than the cover plate and terminates short of the outer end of the support and a rotatable, caster indicating plate 56 is mounted on the cover plate 23 between the forward end of the tread plate 55 and the front end of the support and a similar rotatable plate 56' is mounted on the cover plate 20 of support 10 near the front end of the latter in transverse alignment with the plate 56. These rotatable plates are principally for checking the caster of the vehicle front wheels and are of known construction and constitute no part of the present invention per se. A laterally movable tread plate 57 is mounted on cover plate 22 transversely opposite the fixed tread plate 55 and is also of conventional construction and is provided with a gauge 58 for indicating the toe-end of the vehicle front wheels. The rotatable plates 56 and 56' are provided with caster indicating gauges 59 and 59' and the laterally movable gauge plate 57 is also of known construction and does not constitute a part of the present invention except in the combination thereof with the remaining elements of the entire operative construction.

As the front wheels of a vehicle are being adjusted the wheels rest upon the rotatable plates 56 and 56' and may be turned to the right and left as the wheel caster is adjusted until the proper caster is obtained, the steering angle being indicated by the gauges 59 and 59'. As the front end is being adjusted the vehicle may be moved backwardly and forwardly along the plates 55 and 57 until the gauge 58 indicates the proper amount of toe-in and, as the wheel camber is being adjusted by the jacks and hold-down clamps, the camber may be measured by suitable gauges of known construction until the proper camber is obtained.

The assembled apparatus provides a unitary device for adjusting and checking the entire steering gear geometry of an automotive vehicle, including the caster, camber and toe-end of the vehicle front wheels, in a single operation with a material saving of time and manual labor and with a degree of accuracy not possible with existing apparatus for this purpose.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed is:

Checking and adjusting apparatus for the front wheels of automotive vehicles comprising a pair of spaced apart, substantially parallel supports extending outwardly at floor level from one edge of a repair pit to receive the front wheels of an automotive vehicle and carry front wheel checking and adjusting mechanism, at least one jack supporting beam extending transversely between said supports and slidably carried at its ends on the latter, and hold down devices attachable to said beam and to the front wheel carrying structure of an automotive vehicle to hold said structure to said beam against pressure exerted by a jack disposed between said beam and said vehicle structure, each of said supports comprising a pair of spaced apart, substantially parallel channel irons, an elongated cover plate secured to the top surfaces of both channel irons and extending laterally therebeyond, a respective angle iron secured in the outside angle between each channel iron and said cover plate, and an angle iron secured along the lower edge of the inner channel iron providing a support for the corresponding end of said jack supporting beam, a transverse rail secured to the pit wall at said one edge of the pit, means securing each of said supports to said rail, and means extending from the pit bottom to the under surface of each of said supports to sustain said supports at floor level.

EDWARD C. LANGHAM.

REFERENCES CITED

The following references are of record in the file of this patent:

UNITED STATES PATENTS

| Number | Name | Date |
| --- | --- | --- |
| 1,845,532 | Titus | Feb. 16, 1932 |
| 1,878,664 | Bennett | Sept. 20, 1932 |
| 1,989,307 | Bennett | Jan. 29, 1935 |
| 1,992,521 | Creagmile | Feb. 26, 1935 |
| 2,445,397 | Horton | July 20, 1948 |

FOREIGN PATENTS

| Number | Country | Date |
| --- | --- | --- |
| 448,670 | Great Britain | June 12, 1936 |